(12) United States Patent
Mehta

(10) Patent No.: US 12,367,440 B2
(45) Date of Patent: Jul. 22, 2025

(54) ARTIFICIAL INTELLIGENCE-BASED SYSTEM AND METHOD FOR FACILITATING MANAGEMENT OF THREATS FOR AN ORGANIZATION

(71) Applicant: Sattrix USA LLC, Detroit, MI (US)

(72) Inventor: Jignesh Mehta, Farmington Hills, MI (US)

(73) Assignee: Sattrix USA LLC, Detroit, MI (US)

( * ) Notice: Subject to any disclaimer, the term of this patent is extended or adjusted under 35 U.S.C. 154(b) by 410 days.

(21) Appl. No.: 17/817,659

(22) Filed: Aug. 5, 2022

(65) Prior Publication Data

US 2023/0044156 A1 Feb. 9, 2023

Related U.S. Application Data

(60) Provisional application No. 63/229,540, filed on Aug. 5, 2021.

(51) Int. Cl.
| | |
|---|---|
| *G06Q 10/0635* | (2023.01) |
| *G06V 20/52* | (2022.01) |
| *G06V 40/16* | (2022.01) |
| *H04L 9/40* | (2022.01) |

(52) U.S. Cl.
CPC ......... *G06Q 10/0635* (2013.01); *G06V 20/52* (2022.01); *H04L 63/1433* (2013.01)

(58) Field of Classification Search
CPC .. G06Q 10/0635; G06V 20/52; G06V 40/161; H04L 63/1433; H04L 63/20
See application file for complete search history.

(56) References Cited

U.S. PATENT DOCUMENTS

| | | | | |
|---|---|---|---|---|
| 10,666,666 | B1 * | 5/2020 | Saurabh | H04L 63/1425 |
| 11,245,726 | B1 * | 2/2022 | Kats | G06N 20/00 |
| 2018/0050800 | A1 * | 2/2018 | Boykin | H04N 21/2368 |
| 2019/0260786 | A1 * | 8/2019 | Dunn | G06F 18/23 |
| 2019/0379683 | A1 * | 12/2019 | Overby | H04W 12/122 |
| 2020/0034454 | A1 * | 1/2020 | Chamarajnager | H04L 9/0637 |
| 2020/0186378 | A1 * | 6/2020 | Six | H04L 12/2803 |
| 2020/0396231 | A1 * | 12/2020 | Krebs | H04L 63/1425 |

(Continued)

FOREIGN PATENT DOCUMENTS

WO WO-2023027735 A1 * 3/2023

*Primary Examiner* — Jeremy S Duffield
*Assistant Examiner* — Nicholas Joseph Diluzio
(74) *Attorney, Agent, or Firm* — Jason C. Cameron

(57) ABSTRACT

An AI-based system and method for facilitating management of threats for an organization is disclosed. The method includes receiving one or more inputs captured by a plurality of electronic devices of an organization, determining an AI model based on a type of the one or more inputs, and determining if the one or more inputs correspond to a predefined data range. The method includes detecting one or more threats associated with the organization by using the determined AI model and generating one or more real-time alerts corresponding to the detected one or more threats. Furthermore, the method includes generating one or more recommendations for responding to the detected one or more threats and outputting the detected one or more threats, the generated one or more real-time alerts and the generated one or more recommendations on user interface screen of one or more user devices.

20 Claims, 9 Drawing Sheets

(56) References Cited

U.S. PATENT DOCUMENTS

| | | | |
|---|---|---|---|
| 2021/0126938 A1* | 4/2021 | Trost | G06F 21/552 |
| 2022/0284749 A1* | 9/2022 | Adam | G07C 9/00563 |
| 2022/0329630 A1* | 10/2022 | Li | G06F 21/577 |
| 2023/0179635 A1* | 6/2023 | Schiel | H04L 63/20 |
| | | | 726/23 |
| 2024/0007744 A1* | 1/2024 | Muthiah | H04N 23/90 |

* cited by examiner

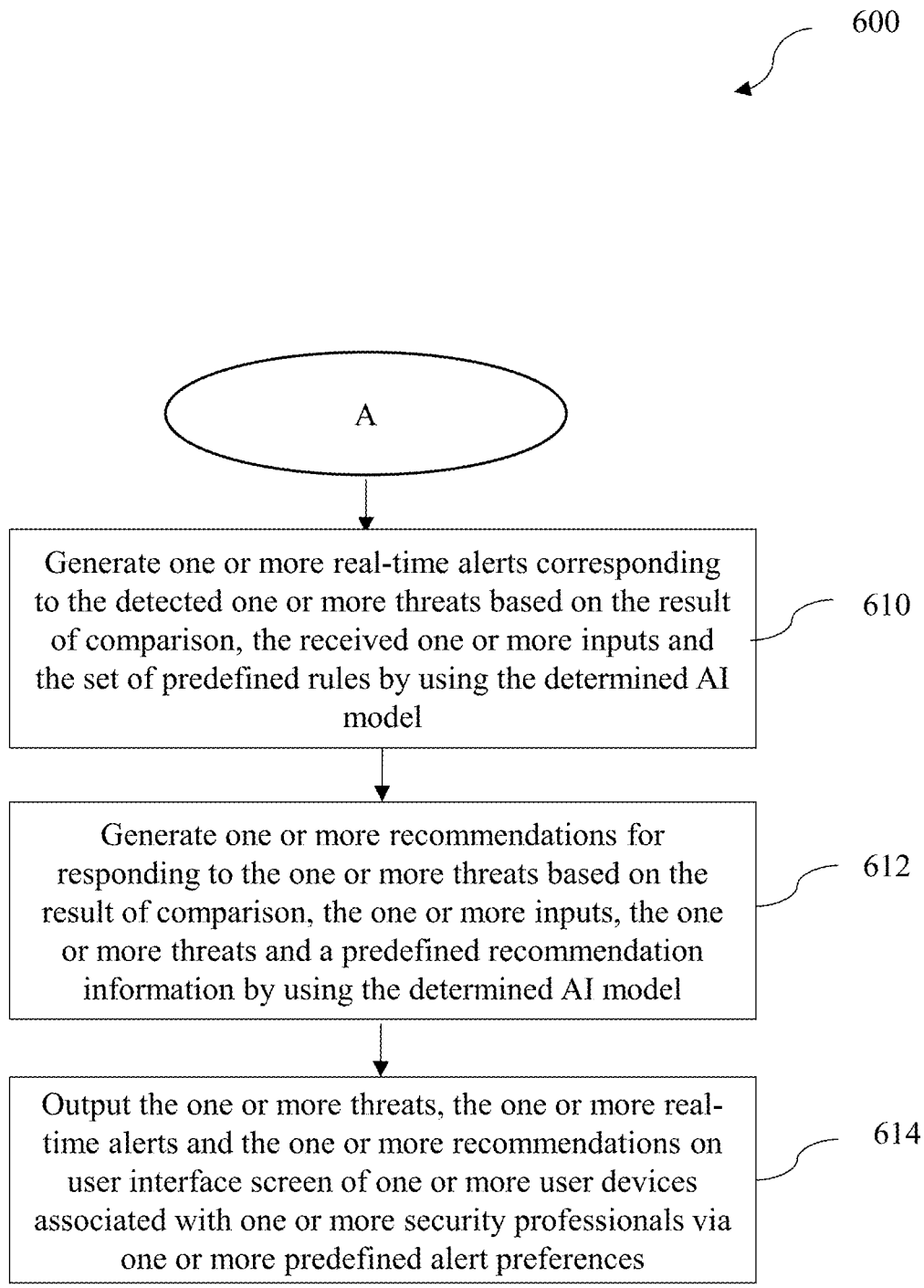
FIG. 6 (contd)

ARTIFICIAL INTELLIGENCE-BASED SYSTEM AND METHOD FOR FACILITATING MANAGEMENT OF THREATS FOR AN ORGANIZATION

EARLIEST PRIORITY DATE

This Application claims priority from a Provisional patent application filed in the United States of America having Patent Application No. 63/229,540, filed on Aug. 5, 2021, and titled "SYSTEM AND METHOD FOR MANAGING INFORMATION SECURITY IN AN ORGANIZATION".

FIELD OF INVENTION

Embodiments of the present disclosure relate to security management system and more particularly relates to an AI-based system and method for facilitating management of threats for an organization.

BACKGROUND

With the advancements in technology, organizations are facing increasing threats to their security. Physical security of their assets and personnel, electronic security of their Information Technology (IT) infrastructure and security of their information in cyber space are all under constant attack. Thus, the organizations are deploying multiple resources to combat these threats or attacks. However, efforts towards these resources are in silos with each having their own strategies, management, and staff with less communication between them. Currently, physical threats have an impact on IT operations, and cyber threats have an impact on physical operations. However, treating cyber and physical threats separately creates an unnecessary confusion, delays, and inefficiencies. When a crisis hits the organization, this lack of cohesive response results in multiple problems including unsatisfactory response to such physical and cyber threats. Further, this fragmented approach leads to significantly increased expenses.

Further, the organizations are required to deal with such physical threats and cyber threats as soon as the physical and cyber threats are detected. However, conventional security management systems fail to detect the physical threats and the cyber threats in a real-time. Thus, there can be multiple consequences of the physical threats, such as loss, theft, physical damage to the IT infrastructure, and the like. Furthermore, perpetrators may also cause damage to the organization if the cyber threats are not detected and responded in real-time, such as data theft, financial losses, operational disruption, and the like.

Hence, there is a need for an improved AI-based system and method for facilitating management of threats for an organization, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an Artificial Intelligence (AI)-based computing system for facilitating management of threats for an organization is disclosed. The AI-based computing system includes one or more hardware processors and a memory coupled to the one or more hardware processors. The memory includes a plurality of modules in the form of programmable instructions executable by the one or more hardware processors. The plurality of modules include a data receiver module configured to receive one or more inputs captured by a plurality of electronic devices of an organization. The plurality of electronic devices include at least one of: one or more physical security devices, one or more electronic security devices, one or more Internet of Things (IoT) sensors and one or more cybersecurity devices. The plurality of modules also include a model determination module configured to determine an AI model based on a type of the received one or more inputs. The type of the received one or more inputs is at least one of: a set of incoming signals, a set of data streams, incoming sensor data range, a set of video streams, a set of incoming logs, and a set of audio streams. The AI model is a range determination-based AI model. The plurality of modules includes a range determination module configured to determine if the received one or more inputs correspond to a predefined data range defined by a customer by comparing the received one or more inputs with the predefined data range for one or more criteria associated with the plurality of electronic devices by using the determined AI model. Further, the plurality of modules includes a data detection module configured to detect one or more threats associated with the organization based on result of comparison, the received one or more inputs and a set of predefined rules by using the determined AI model upon determining that the received one or more inputs does not correspond to the predefined data range. The one or more threats are one or more physical threats and one or more cyber threats. The plurality of modules also include an alert generation module configured to generate one or more real-time alerts corresponding to the detected one or more threats based on the result of comparison, the received one or more inputs and the set of predefined rules by using the determined AI model. The one or more real-time alerts include related meta-data and one or more visual video streams associated with the detected one or more threats. The related metadata and the one or more visual video streams are obtained from the received one or more inputs. Furthermore, the plurality of modules include a recommendation generation module configured to generate one or more recommendations for responding to the detected one or more threats based on the result of comparison, the received one or more inputs, the detected one or more threats and a predefined recommendation information by using the determined AI model upon generating the one or more real-time alerts. The plurality of modules include a data output module configured to output the detected one or more threats, the generated one or more real-time alerts and the generated one or more recommendations on user interface screen of one or more user devices associated with one or more security professionals via one or more predefined alert preferences. The one or more predefined alert preferences include push notification, email, text and phone call.

In accordance with another embodiment of the present disclosure, an AI-based method for facilitating management of threats for an organization is disclosed. The AI-based method includes receiving one or more inputs captured by a plurality of electronic devices of an organization. The plurality of electronic devices include at least one of: one or more physical security devices, one or more electronic security devices, one or more Internet of Things (IoT) sensors and one or more cybersecurity devices. The AI-based method further includes determining an AI model based on a type of the received one or more inputs. The type of the received one or more inputs is at least one of: a set of incoming signals, a set of data streams, incoming sensor data range, a set of video streams, a set of incoming logs, and a set of audio streams. The AI model is a range determination-based AI model. Further, the AI-based method includes determining if the received one or more inputs correspond to a predefined data range defined by a customer by comparing the received one or more inputs with the predefined data range for one or more criteria associated with the plurality of electronic devices by using the determined AI model. Also, the AI-based method includes detecting one or more threats associated with the organization based on result of comparison, the received one or more inputs and a set of predefined rules by using the determined AI model upon determining that the received one or more inputs does not correspond to the predefined data range. The one or more threats are one or more physical threats and one or more cyber threats. Furthermore, the AI-based method includes generating one or more real-time alerts corresponding to the detected one or more threats based on the result of comparison, the received one or more inputs and the set of predefined rules by using the determined AI model. The one or more real-time alerts include related meta-data and one or more visual video streams associated with the detected one or more threats. The related metadata and the one or more visual video streams are obtained from the received one or more inputs. The AI-based method also includes generating one or more recommendations for responding to the detected one or more threats based on the result of comparison, the received one or more inputs, the detected one or more threats and a predefined recommendation information by using the determined AI model upon generating the one or more real-time alerts. Further, the AI-based method includes outputting the detected one or more threats, the generated one or more real-time alerts and the generated one or more recommendations on user interface screen of one or more user devices associated with one or more security professionals via one or more predefined alert preferences. The one or more predefined alert preferences include push notification, email, text and phone call.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1A:
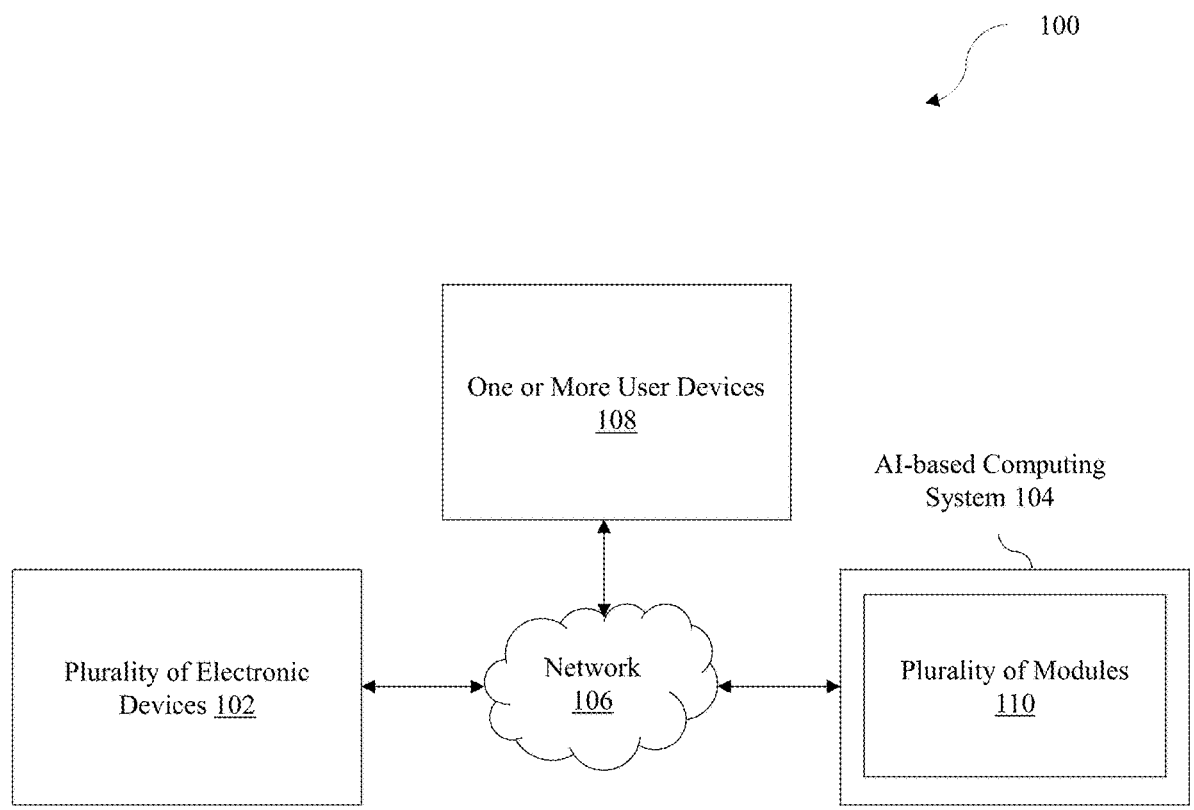
FIG. 1A is a block diagram illustrating an exemplary computing environment for facilitating management of threats for an organization, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1A through FIG. 6, where similar reference characters denote corresponding features consistently throughout the figures, there are shown preferred embodiments and these embodiments are described in the context of the following exemplary system and/or method.

FIG. 1A is a block diagram illustrating an exemplary computing environment 100 for facilitating management of threats for an organization, in accordance with an embodiment of the present disclosure. According to FIG. 1A, the computing environment 100 includes a plurality of electronic devices 102 associated with an organization communicatively coupled to an AI-based computing system 104 via a network 106. The plurality of electronic devices 102 are configured to capture one or more inputs. In an embodiment of the present disclosure, the one or more inputs are data associated with the organization, such as a set of incoming signals, a set of data streams, incoming sensor data range, a set of video streams, a set of incoming logs, a set of audio streams, and the like. In an exemplary embodiment of the present disclosure, the plurality of electronic devices 102 include one or more physical security devices, one or more electronic security devices, one or more Internet of Things (IoT) sensors, one or more cybersecurity devices, or any combination thereof. For example, the one or more inputs may include one or more videos captured by a closed-circuit television (CCTV). In an embodiment of the present disclosure, the AI-based computing system 104 may be a security management system configured to manage one or more threats for the organization, such as one or more physical threats and one or more cyber threats. In an embodiment of the present disclosure, the AI-based computing system 104 corresponds to an alert device communicatively coupled to the plurality electronic devices or a central server. In an embodiment of the present disclosure, the alert device includes one or more smart sensors to capture environmental data, such as air quality, smoke temperature, humidity and other harmful gases. In an embodiment of the present disclosure, the alert device includes a set of harmful gas sensing devices. The set of harmful gas sensing devices collect all alerts corresponding to the environmental data and the collected alerts are outputted on one or more user devices 108 only when the environmental data crosses customers' preferable limit. For example, the central server may be a cloud server or a remote server. Further, the network 106 may be internet or any other wireless network.

Further, the computing environment 100 includes one or more user devices 108 associated with one or more security professionals communicatively coupled to the AI-based computing system 104 via the network 106. The one or more user devices 108 are used by the one or more security professionals to receive one or more threats, one or more real-time alerts and one or more recommendations. In an embodiment of the present disclosure, the one or more security professionals are responsible for protecting Information Technology (IT) infrastructure, edge devices, networks, data associated with the organization, and the like. In an exemplary embodiment of the present disclosure, the one or more user devices 108 may include a laptop computer, desktop computer, tablet computer, smartphone, wearable device, smart watch, and the like.

Furthermore, the one or more user devices 108 include a local browser, a mobile application or a combination thereof. Furthermore, the one or more security professionals may use a web application via the local browser, the mobile application or a combination thereof to communicate with the AI-based computing system 104 and receive one or more real-time alerts. In an exemplary embodiment of the present disclosure, the mobile application may be compatible with any mobile operating system, such as android, iOS, and the like. In an embodiment of the present disclosure, the AI-based computing system 104 includes a plurality of modules 110. Details on the plurality of modules 110 have been elaborated in subsequent paragraphs of the present description with reference to FIG. 2.

In an embodiment of the present disclosure, the AI-based computing system 104 is configured to receive the one or more inputs captured by the plurality of electronic devices 102 of the organization. Further, the AI-based computing system 104 determines an AI model based on a type of the received one or more inputs. The AI-based computing system 104 determines if the received one or more inputs correspond to a predefined data range defined by a customer by comparing the received one or more inputs with the predefined data range for one or more criteria associated with the plurality of electronic devices 102 by using the determined AI model. Furthermore, the AI-based computing system 104 detects the one or more threats associated with the organization based on result of comparison, the received one or more inputs and a set of predefined rules by using the determined AI model upon determining that the received one or more inputs does not correspond to the predefined data range. The AI-based computing system 104 generates the one or more real-time alerts corresponding to the detected one or more threats based on the result of comparison, the received one or more inputs and the set of predefined rules by using the determined AI model. The AI-based computing system 104 generates the one or more recommendations for responding to the detected one or more threats based on the result of comparison, the received one or more inputs, the detected one or more threats and a predefined recommendation information by using the determined AI model upon generating the one or more real-time alerts. Further, the AI-based computing system 104 outputs the detected one or more threats, the generated one or more real-time alerts and the generated one or more recommendations on user interface screen of the one or more user devices 108 associated with the one or more security professionals via one or more predefined alert preferences.

Figure 1B:
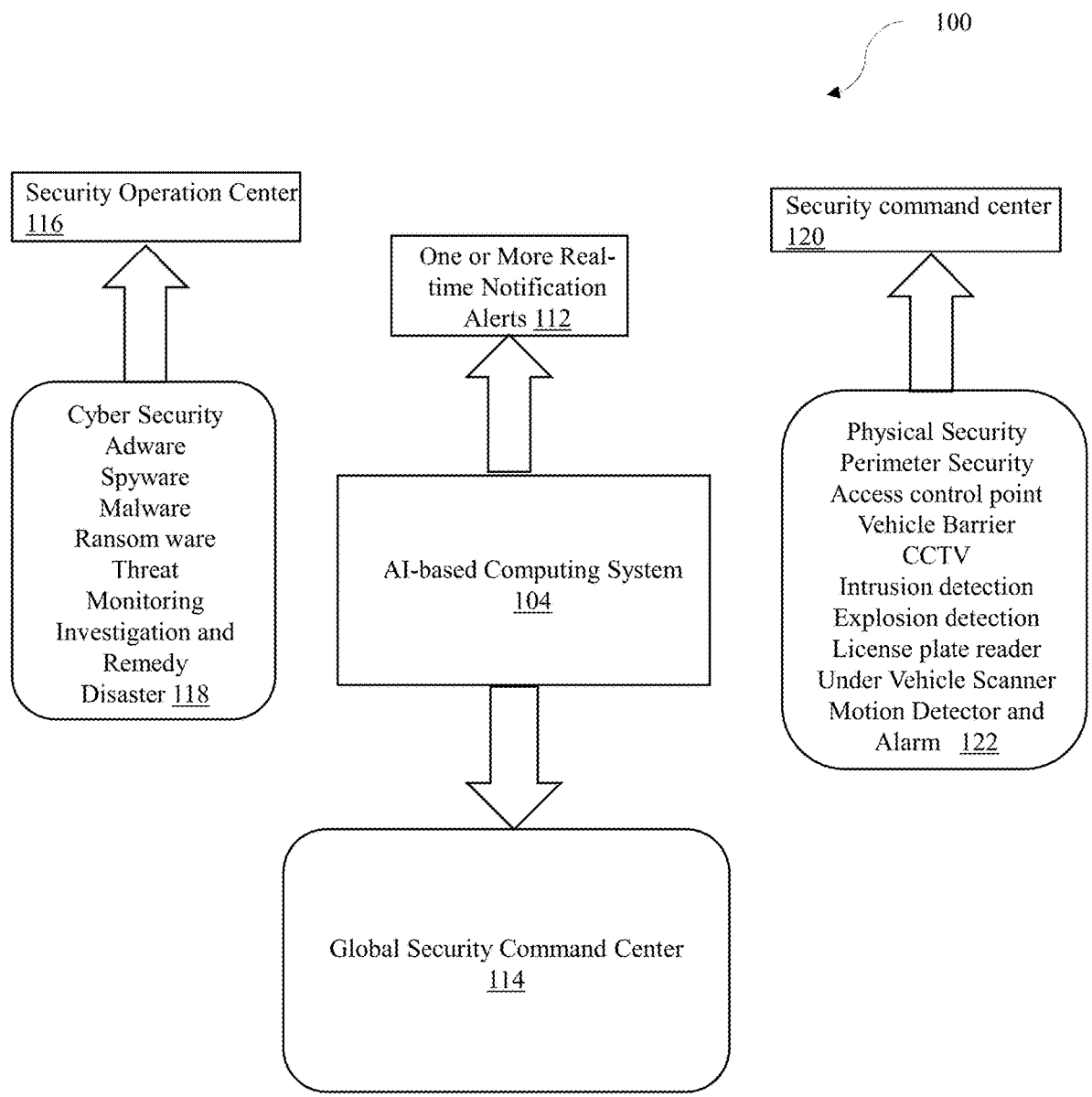
FIG. 1B is a block diagram illustrating an exemplary computing environment for facilitating management of threats for the organization, in accordance with another embodiment of the present disclosure.

FIG. 1B is a block diagram illustrating an exemplary computing environment 100 for facilitating management of threats for the organization, in accordance with another embodiment of the present disclosure. The computing environment 100 includes the AI-based computing system 104 i.e., the security management system. In an embodiment of the present disclosure, the AI-based computing system 104 corresponds to the alert device communicatively coupled to the plurality electronic devices or the central server, such as the cloud server or the remote server. In an exemplary embodiment of the present disclosure, the AI-based computing system 104 may perform video analytics using video processing techniques and using machine learning based algorithms to provide one or more real-time notification alerts 112. Further, the computing environment 100 provides a single point of coordination, such as a Global Security Operations Center (GSOC) 114 which makes the positions of the organizations much stronger and stable to respond to a crisis. In an embodiment of the present disclosure, the GSOC 114 uses automated technology to provide integrated intelligence and analytics to monitor security, improve incident response, and mitigate risks. Further, in an era of budget austerity, consolidating physical and cybersecurity systems offer significant cost savings. The GSOC 114 monitors the one or more inputs received from the plurality of electronic devices 102. For example, the GSOC 114 performs cyber and physical monitoring. In an embodiment of the present disclosure, this mechanism provides a central point of coordination to monitor and respond to threats to business operations regardless of where the one or more threats originate. Furthermore, the computing environment 100 includes a security operation center 116. In an embodiment of the present disclosure, the security operation center 116 monitors and improves the organization's security posture while preventing, detecting, analyzing, and responding to cybersecurity incidents. The security operation center 116 includes cybersecurity, adware, spyware, malware, ransomware, threat, monitoring, investigation and remedy, disaster management module 118 and the like. The security operation center 116 includes features such as collecting all logs or events from a local server and preparing and providing response to cyber emergencies, monitoring, analysing, correlating and escalating intrusion events, conducting incident management and forensic investigation, assisting in crisis operations, displaying live output on server, monitoring events around-the-clock and providing in depth information, spotting patterns across a number of security alerts to provide advance warning on new threats, developing appropriate response and protection, detection and responding to electronic security such as the GSOC 114. In an embodiment of the present disclosure, all the AI and Security system generate data stream which gets processed by the GSOC, where each data stream gets evaluated with the rules and validations. In an embodiment of the present disclosure, based on the rules and validation, the real time alert notification is sent to the users based on the definition and user credentials. Each real time alert notification is attached with appropriate charts and back up information. Further, the AI model helps to send customer notification only when the AI model identifies that the alerts crossed a customer preferable limit. Also, security operation center gets notification if any of the customer devices are powered off, lost internet connection, local PC not working, application is stopped working, and the like. In all of these instances, the AI model senses remotely and sends "alerts" to security operation center. Further, the users review these alerts in details, investigate and either resolve issues or notify customer appropriately.

Further, the computing environment 100 includes a security command center 120. In an embodiment of the present disclosure, the security command center 120 is a central unit which helps the organization to strengthen security posture by evaluating security and data attack surface, providing asset inventory and discovery, identifying misconfigurations, vulnerabilities, threats; and helping the organization to mitigate and remediate risks. The security command center 120 includes physical security, perimeter security, access control point, vehicle barrier, Closed Circuit Television (CCTV), intrusion detection, explosion detection, license plate reader, under vehicle scanner, motion detector and alarm, 122 and the like. The GSOC 114 includes the security command center 120 and cybersecurity activities resulting in comprehensive transparency, situation and visual awareness among all security silos such as physical, electronic, Internet of Things (IoT) and cybersecurity.

Figure 1C:
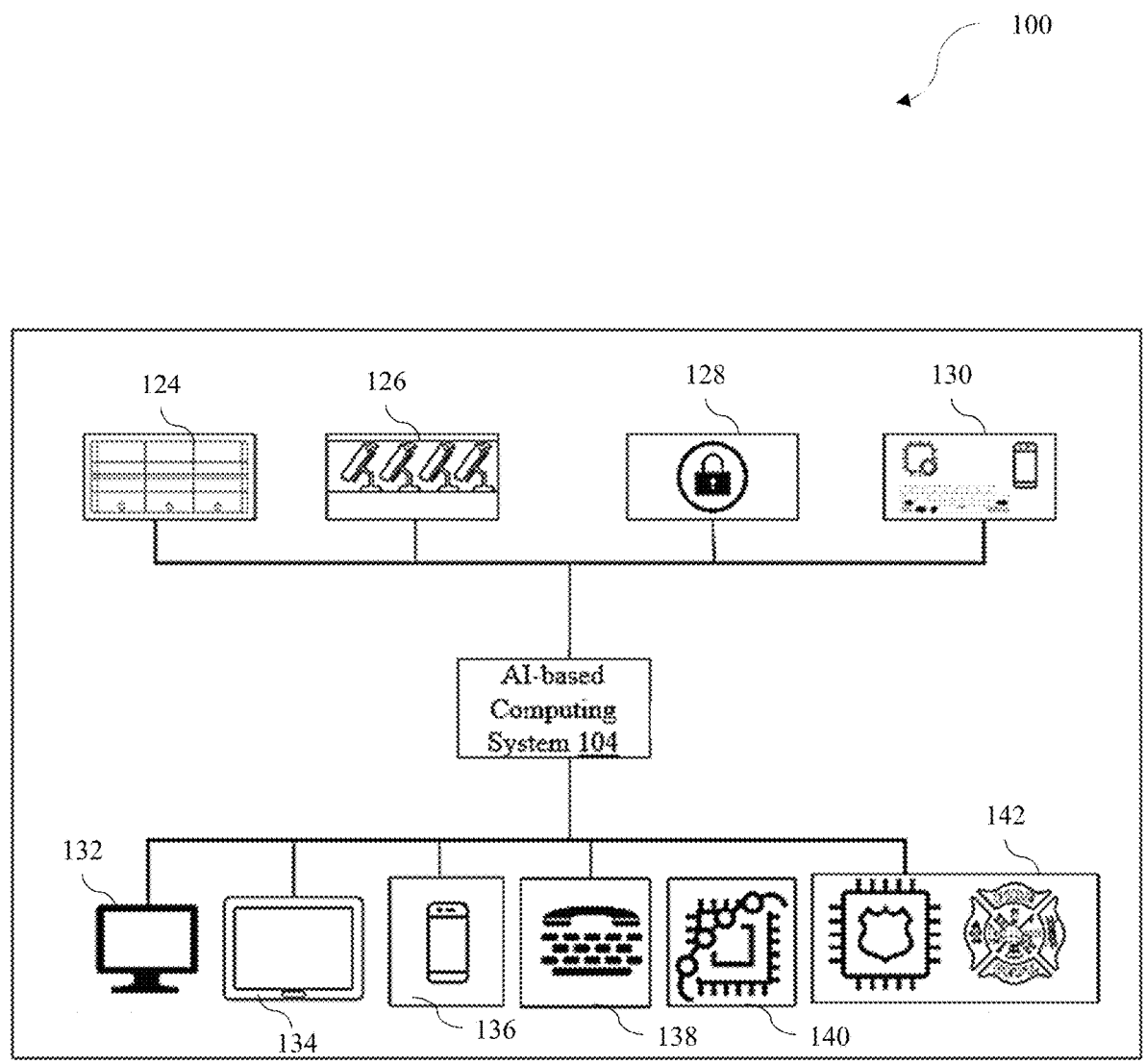
FIG. 1C is a block diagram illustrating an exemplary computing environment for facilitating management of threats for the organization, in accordance with another embodiment of the present disclosure.

FIG. 1C is a block diagram illustrating an exemplary computing environment 100 for facilitating management of threats for the organization, in accordance with an embodiment of the present disclosure. The AI-based computing system 104 receives inputs from physical security 124, electronic security 126, cyber security 128, IoT embedded systems 130 and the like, processes and sends real time notifications through various medium such as computer, laptop 132, tablet 134, mobile phone 136, landline phone 138, System-on-a-chip (SoC) 140, first responder 142, and the like. The AI-based computing system 104 also provides just in time incident detection, real time alerting from any device on any device and effective initial immediate incident response management.

Figure 2:
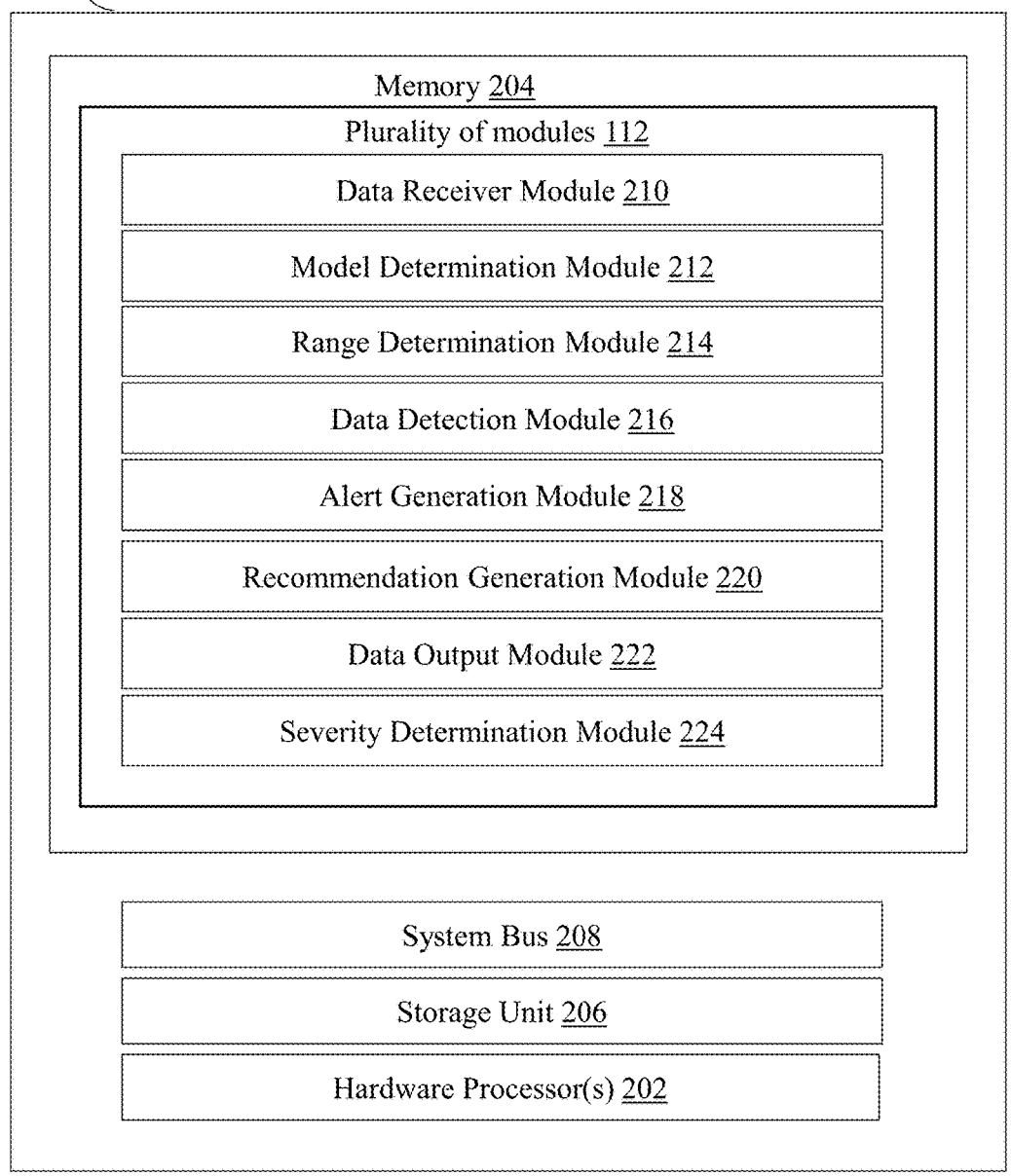
FIG. 2 is a block diagram illustrating an exemplary AI-based computing system for facilitating management of threats for the organization, in accordance with an embodiment of the present disclosure.

FIG. 2 is a block diagram illustrating an exemplary AI-based computing system 104 for facilitating management of threats for the organization, in accordance with an embodiment of the present disclosure. Further, the AI-based computing system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes a data receiver module 210, a model determination module 212, a range determination module 214, a data detection module 216, an alert generation module 218, a recommendation generation module 220, a data output module 222, and a severity determination module 224.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

In an embodiment of the present disclosure, the storage unit 206 may be a microchip. In another embodiment of the present disclosure, the storage unit 206 may be a cloud storage. The storage unit 206 may store the one or more inputs, the one or more criteria, a set of predefined rules, the one or more real-time alerts, the one or more recommendations, one or more predefined stream parameters, a customer criterion, one or more predefined security parameters, and the like.

The data receiver module 210 is configured to receive the one or more inputs captured by the plurality of electronic devices 102 of the organization. In an exemplary embodiment of the present disclosure, the plurality of electronic devices 102 include one or more physical security devices, one or more electronic security devices, one or more IoT sensors, one or more cybersecurity devices or any combination thereof. In an exemplary embodiment of the present disclosure, the one or more physical security devices include a set of access controls, biometrics access controls, a set of interior barriers, a set of exterior barriers, and the like. In an embodiment of the present disclosure, the set of access controls, biometrics access controls, the set of interior barriers, and the set of exterior barriers physical security are for physical security. The one or more electronic security devices include CCTV, license plate reader, one or more analog cameras, one or more Internet Protocol (IP) cameras, one or more biometrics, and the like. In an exemplary embodiment of the present disclosure, the one or more IoT sensors include temperature sensor, humidity sensor, pressure sensor, heat sensor, vibration sensor, accelerometer, radio frequency integration (RFID) devices, hazardous gas sensor, smoke sensor, fire sensor, and the like. The one or more cybersecurity devices include network, event logs, Security Information and Event Management (SIEM), and the like.

The model determination module 212 is configured to determine the AI model based on the type of the received one or more inputs. The type of the received one or more inputs is a set of incoming signals, a set of data streams, incoming sensor data range, a set of video streams, a set of incoming logs, a set of audio streams, or any combination thereof. In an embodiment of the present disclosure, the AI model is a range determination-based AI model. For example, the range determination-based AI model is a machine learning model The range determination-based AI model corresponds to smart and proprietary model that helps in generating automated alerts based on customer preferences.

The range determination module 214 is configured to determine if the received one or more inputs correspond to the predefined data range defined by the customer by comparing the received one or more inputs with the predefined data range for the one or more criteria associated with the plurality of electronic devices 102 by using the determined AI model. For example, if temperature sensor indicates temperature is 80 F, and the user has defined to generate alerts when the temperature is more than 75 F, the temperature sensor may send the data stream via the AI and the user is notified with the data of last 3 hours temperature pattern on the computer or mobile device. In an exemplary embodiment of the present disclosure, the one or more criteria include access restrictions, an access level, a schedule, a geographic location, advanced video analytics, and the like. Further, the advanced video analytics include motion detection, object detection, line crossing, face detection, and the like. For example, the AI-based computing system 104 may perform object detection based on configuration. In an embodiment of the present disclosure, the object within the video capture is defined by the user in the geo-pattern for the specific CCTV. Further, any movement of the same object within the geo physical boundaries may be triggered as object detection. For example, the object detection may be face detection. If the object is a specific person, then the AI-based computing system 104 may generate an alert rather than false alerts generated due to non-persons-based alerts. These objects may be human beings, cars or some other animal based on configuration. The AI-based computing system 104 may execute face detection, and face recognition to generate appropriate alerts. For example, CCTV may capture the frame of the human body. Further, AI and advanced video analytics are utilized to detect the human body and face detection. In an embodiment of the present disclosure, the face image is enhanced and segmented. Further, the face boundary and facial features are detected. The extracted features are matched against the features in the use list and database. Furthermore, the identification into one or more persons is recognized. In an embodiment of the present disclosure, if alerts are defined for face detection or face recognition. In that case, if CCTV captures frames that includes one or more objects like specific person images with "face" detection or recognition, then it will generate an "correct" alert rather than "false alerts" due to "non-persons" based alerts.

In determining if the received one or more inputs correspond to the predefined data range defined by the customer by comparing the received one or more inputs with the predefined data range for the one or more criteria associated with the plurality of electronic devices 102 by using the determined AI model, the range determination module 214 compares the set of data streams with one or more predefined stream parameters corresponding to the predefined data range by using access control logic library of the determined AI model. In an embodiment of the present disclosure, the set of data streams correspond to physical security signal from the set of access controls. In an exemplary embodiment of the present disclosure, the one or more predefined stream parameters include role, if list or outside of schedule, and the like. Further, the range determination module 214 determines if the received set of data streams correspond to the predefined data range based on result of comparison. For example, when the user is approaching access control points and user face is recognized by the CCTV at the same locations, and bio-Metrix access control is required, data stream matches with the badge reader data, face recognition data and bio-matrix data. In an embodiment of the present disclosure, all may be analyzed in real time with the user definition and access may be granted or denied. Also, as per definition, other appropriate people may be notified in real time about the entry or exit of the user. In another example, if someone lost the badge and then incorrect person utilized the lost badge to enter secured area then AI-based computing system 104 may generate alerts due to incorrect face recognition. The generated alerts means that an unauthorized user is trying to access this secured area and it may be denied the entry. Also, the AI-based computing system 104 may send "unauthorized users" notification to selected user management and administrators.

Further, in determining if the received one or more inputs correspond to the predefined data range defined by the customer by comparing the received one or more inputs with the predefined data range for the one or more criteria associated with the plurality of electronic devices 102 by using the determined AI model, the range determination module 214 performs one or more processing operations on combined set of video streams, the set of audio streams, or a combination thereof received from Digital Video Recorder (DVR), Network Video Recorder (NVR) or a combination thereof by using advanced video analytics libraries. In an exemplary embodiment of the present disclosure, the one or more processing operations include motion detection based geo-physical boundary, object detection including face detection, license plate reader, a set of harmful gas sensor, and the like. For example, the object detection is face detection. In an exemplary embodiment of the present disclosure, the set of harmful gas sensors include smoke sensor, CO sensor, $CO_2$ sensor, ammonia sensor, benzene and the like. In an embodiment of the present disclosure, the set of video streams, and the set of audio streams are received from security cameras. Further, the range determination module 214 compares the combined set of video streams, the set of audio streams, or a combination thereof with a customer criterion for corresponding advanced video analytics datasets by using the determined AI model upon performing the one or more processing operations. In an embodiment of the present disclosure, the advanced video analytics datasets include data associated with the video stream qualities and available features. The advanced video analytics datasets is used to detect motion in the frame of video, human body movement, object movement, color definition, contract definition, object character recognition of reading the license plate characters, and the like. The range determination module 214 determines if the combined set of video streams, and the set of audio streams or a combination thereof correspond to the predefined data range based on result of comparison. For example, the customer criteria may be to generate alerts when temperature crosses 80 F.

Furthermore, in determining if the received one or more inputs correspond to the predefined data range defined by the customer by comparing the received one or more inputs with the predefined data range for the one or more criteria associated with the plurality of electronic devices 102 by using the determined AI model, the range determination module 214 compares the incoming sensor data range received from the one or more IoT sensors with one or more predefined sensor parameters corresponding to the predefined data range by using the determined AI model. In an exemplary embodiment of the present disclosure, the incoming sensor data range corresponds to temperature, humidity, air quality, harmful gases, lighting, vibration, sound, and the like. For example, the AI-based computing system constantly reviews various alerts from all types of devices and may correspondingly compare with customer preferences with low and high limits. Further, if any of these preferences cross either of these limits, then alerts may be generated and sent to customers automatically. In an exemplary embodiment of the present disclosure, the one or more predefined sensor parameters include customer high, low range, government guidelines, government regulations, or any combination thereof. The range determination module 214 determines if the incoming sensor data rage corresponds to the predefined data range based on result of comparison.

In an embodiment of the present disclosure, in determining if the received one or more inputs correspond to the predefined data range defined by the customer by comparing the received one or more inputs with the predefined data range for the one or more criteria associated with the plurality of electronic devices 102 by using the determined AI model, the range determination module 214 compares the set of incoming logs received from the one or more cybersecurity devices with one or more predefined security parameters corresponding to the predefined data range by using the determined AI model. For example, the set of incoming logs for cyber security perspective may include penetration, hacking, phishing, scamming, malware, virus, and the like. When incoming data stream is compared with the ideal or acceptable climate, the deviated data incoming logs are triggered for an appropriate user action. In an embodiment of the present disclosure, action may be denied access, deletion of file/email/data, turning on or off the system, or the like. In an embodiment of the present disclosure, the set of incoming logs may also include one or more cyber-attacks, such as ransomware, Distributed Denial of Services (DDOS), Structured Query Language (SQL) Injection (database related attacks), firewall attacks, open ports penetration attacks, and the like. In an embodiment of the present disclosure, the one or more predefined security parameters include one or more potential cyber threats, one or more security incidents, one or more hacking attacks, or any combination thereof. Further, the range determination module 214 determines if the set of incoming logs correspond to the predefined data range based on result of comparison.

The data detection module 216 is configured to detect the one or more threats associated with the organization based on result of comparison, the received one or more inputs and the set of predefined rules by using the determined AI model upon determining that the received one or more inputs does not correspond to the predefined data range. In an embodiment of the present disclosure, the set of predefined rules are set of rules which helps the AI-based computing system 104 to detect the threats based on the result of comparison. For example, when a perpetrator attempts to access a system in an unauthorized manner, the AI-based computing system 104 detects a cyberattack on the system by using the set of predefined rules. In an embodiment of the present disclosure, the one or more threats are one or more physical threats and one or more cyber threats. The one or more physical threats include loss of an entire computer system, damage of hardware, damage to a computer software, theft of the computer system, vandalism, natural disaster including flood, fire, war, earthquakes, and the like. The one or more cyber threats refers to any possible malicious attack that seeks to unlawfully access data, disrupt digital operations, or damage information. In an exemplary embodiment of the present disclosure, the one or more threats correspond to cyberattacks, data breach, technological failures, natural disaster, unauthorized access, intrusion, infrastructural damages, and the like.

The alert generation module 218 is configured to generate the one or more real-time alerts corresponding to the detected one or more threats based on the result of comparison, the received one or more inputs and the set of predefined rules by using the determined AI model. In an embodiment of the present disclosure, the one or more real-time alerts include related meta-data and one or more visual video streams associated with the detected one or more threats. In an embodiment of the present disclosure, the visual video stream along with meta-data coming from the associated sensors data can be combined based on the user definition. For example, when specific area sensor detects vibration to be higher than the user defined range, the associated CCTV in the proximity may be triggered and video stream may be activated. Further, the combined meta data stream and visual video streams in the real time alerts may be notified as per user definition. In an embodiment of the present disclosure, the related metadata and the one or more visual video streams are obtained from the received one or more inputs. For example, the AI-based computing system 104 may generate the one or more real-time alerts for parking solutions by recognizing any state-based vehicle license plates and providing parking capacity alerts. For example, when the license plate reader recognizes the definition provided by the user and law enforcement, it will trigger the real time alert for the specific license plate and notify the appropriate users based on the definition. Further, number of vehicles entering and existing the parking lots are calculated in real time and compared to the parking lot capacity. The real time alerts and notification may be generated based on the comparison. In another example, if any state police issued alert associated with a specific license plate for stolen vehicle, amber alert, and the like, then appropriate authorities can be alerted as well. The AI-based computing system 104 utilizes machine learning or deep learning techniques to provide accurate results over time. Further, the AI-based computing system 104 may integrate with intrusion or access control systems and generate the one or more real-time alerts for unauthorized access. For example, when unauthorized user is trying to enter or exit through the access control and if sensor, video stream and bio matrix definition creates violation of the definition, real time alert is generated, and appropriate users are notified. The AI-based computing system 104 may identify and generate the one or more real-time alerts based on access patterns for proactive prevention of incidents. For example, if some user come back during weekend and tries to access certain secure areas. This is considered as "insider threat" i.e., an existing employee with access is misusing their access at different times when other users are not present. This can be access pattern that will trigger an alert. Furthermore, the AI-based computing system 104 may integrate with perimeter security by connecting the AI-based computing system 104 with different sensors such as heat, motion, pressure, vibration, accelerometer, and the like. In another example, the AI-based computing system 104 may generate alerts based on inputs received from RFID devices and other sensor devices. The AI-based computing system 104 processes these inputs and signal to decide on appropriate type of alerts. For example, multiple ID and access cards are equipped with RFID which can be integrated and as soon as RFID equipment comes in contact with either access control reader of CCTV system, a trigger is generated, and real time alert notification can be created as per user definition. In an embodiment of the present disclosure, RFID also provide location enabled alerts, such that it can be identified that which door or gates has been utilized to access. In large or multi-location facility these alerts can be very useful. The user of the AI-based computing system 104 mark devices as sensitive and configure them for notification. In an embodiment of the present disclosure, any sensitive equipment can be equipped with RFID devise and can be configured along with geophysical definition. Any movement or operation of sensitive equipment may be triggered with RFID and real time alert can be generated as per user definition. The users can track alerts and respond through their respective mobile application via, text, or email communication or the like. In an embodiment of the present disclosure, the user may have multiple response ability based on the user definition. The user may be able to just receive alert notification, save with comments for later processing, share with the other authorized user via email, text, and contact law and enforcement for the emergency. Depending upon the situation, the user may notify or call 911 from within the mobile application, notify or share an alert with other colleagues, or make necessary comments for this alerts for other user's review.

The recommendation generation module 220 is configured to generate the one or more recommendations for responding to the detected one or more threats based on the result of comparison, the received one or more inputs, the detected one or more threats and a predefined recommendation information by using the determined AI model upon generating the one or more real-time alerts. In an embodiment of the present disclosure, the predefined recommendation information is a look-up table of possible recommendations which may be generated for the detected one or more threats. For example, the one or more recommendations may include disconnect your internet, disable remote access, maintain your firewall settings, install any pending security updates or patches, change passwords, and the like.

The data output module 222 is configured to output the detected one or more threats, the generated one or more real-time alerts and the generated one or more recommendations on user interface screen of one or more user devices 108 associated with the one or more security professionals via the one or more predefined alert preferences. In an embodiment of the present disclosure, the one or more predefined alert preferences include push notification, email, text, phone call, and the like.

The severity determination module 224 is configured to determine if the detected one or more threats are one or more real threats or one or more false positives. In an embodiment of the present disclosure, conversion of threat from false positive to real threat is a major technological challenge. The AI model, ML model or a combination thereof, and advance video analytics are developed for such conversion. In an embodiment of the present disclosure, motion-based alerts are verified with face detection. The sensor data is verified and re-verified with the pattern of data and integrated with other data stream if available. In an embodiment of the present disclosure, AI model may facilitate in reduction of "false alerts" by verifying multiple additional criteria that may reduce human element thus reducing overall cost per alert. Further, the severity determination module 224 classifies the detected one or more threats in one or more categories upon determining that the detected one or more threats are the one or more real threats. Based on the user definition, severity may be classified in different categories which can be associated with video stream data, sensor data or access control data. These alerts may have multiple user definition and multiple real time alerts may be generated as per user definition. In an embodiment of the present disclosure, the one or more categories may include camera alerts with face detection, motion detection, sensor alerts, cybersecurity alerts and the like. In an exemplary embodiment of the present disclosure, the sensor alerts correspond to smoke, smoking, CO, CO2, and various other harmful gases. In an exemplary embodiment of the present disclosure, the cybersecurity alerts may be ransomware, DDOS, SQL, and the like. In an embodiment of the present disclosure, the one or more categories include high, medium, low, and safe. The severity determination module 224 outputs the classified one or more threats on user interface screen of the one or more user devices 108 via the one or more predefined alert preferences. For example, the severity determination module 224 is designed for automated monitoring of one or more events associated with the one or more inputs received from the plurality of electronic devices 102 and verify the one or more events to qualify for end user, such as if an event is false positive or real incident and then categorize into the one or more categories. In an embodiment of the present disclosure, the one or more categories are pre-defined severity categories.

In an embodiment of the present disclosure, the AI-based computing system 104 may detect various restricted events based on the received one or more inputs, such as received signals or streaming from camera or any other sensing devices. Further, a user, as administrator, can schedule and configure the one or more real-time alerts based on an installed location and sensitivity of area. For example, administrator may have rights to schedule the desired alert notification for each CCTV and sensing device. This feature may assist to eliminate unnecessary alert notification during normal operation hours. Also, it can define the sensitive sensing device and CCTV to generate real time alert as desired time and date. In another example, camera alerts from parking area during normal hours can be ignored whereas during night-time, it will be considered valid alerts. Similarly, office lobby motions are ignored during normal time but such alerts are considered when office is already closed. In an embodiment of the present disclosure, users of the AI-based computing system 104 may track the one or more real-time alerts and respond through their respective mobile application via, text, email communication or the like. For example, the AI-based computing system 104 is developed as a mobile application intended for multiple platforms. In an exemplary embodiment of the present disclosure, the mobile application is available on the multiple platforms for smart phone, laptop, desktop and the like. For example, the multiple platforms are Apple, Android and Microsoft, Amazon and the like In an embodiment of the present disclosure, the AI-based computing system 104 correspond to a highly interactive, easy to use and smart solution to obtain all security alerts from different locations and devices. In an exemplary embodiment of the present disclosure, the AI-based computing system 104 is an application which can be hosted either on cloud or on other secured hosting platforms. The AI-based computing system 104 may provide desktop-based platform for camera wall and other application configuration. In an embodiment of the present disclosure, the one or more security devices, such as badge reader, biometrics sensor, motion detector, camera, computer or server login, IoT device, access control point, or any device connected on a security system network may detect the one or more threats and generate the one or more real-time alerts. In an embodiment of the present disclosure, the AI-based computing system 104 obtains real time alerts from video surveillance devices, access control systems, and industrial systems and unify them in single interface for the user.

Further, the AI-based computing system 104 includes physical security, perimeter security, access control point, vehicle barrier, CCTV, intrusion detection, explosion detection, license plate reader, under vehicle scanner, motion detector, alarm, and the like. In an embodiment of the present disclosure, the AI-based computing system 104 includes a surveillance system which uses the CCTV to monitor inappropriate behaviours. The surveillance system is present for preventing crimes and fly-tripping by police and government. However, private information such as faces, and behaviours are captured by the CCTV, which may lead to invasion of privacy and crimes. In an embodiment of the present disclosure, scrambling and radio frequency identification is added to the surveillance system to prevent privacy exposure in monitoring simultaneously for both privacy protection and surveillance. In an embodiment of the present disclosure, face recognition with identification of an individual human being is kept for law and enforcement only. Real time alert notification is created based on the user definition and any kind of Privacy information is not revealed by the AI-based computing system 104. The AI-based computing system 104 adjusts the intensities of privacy according to access levels to reduce invasion of privacy by people who are not concerned. Further, the AI-based computing system 104 allows "role-based access", such that not all users have access to everything.

Figure 3:
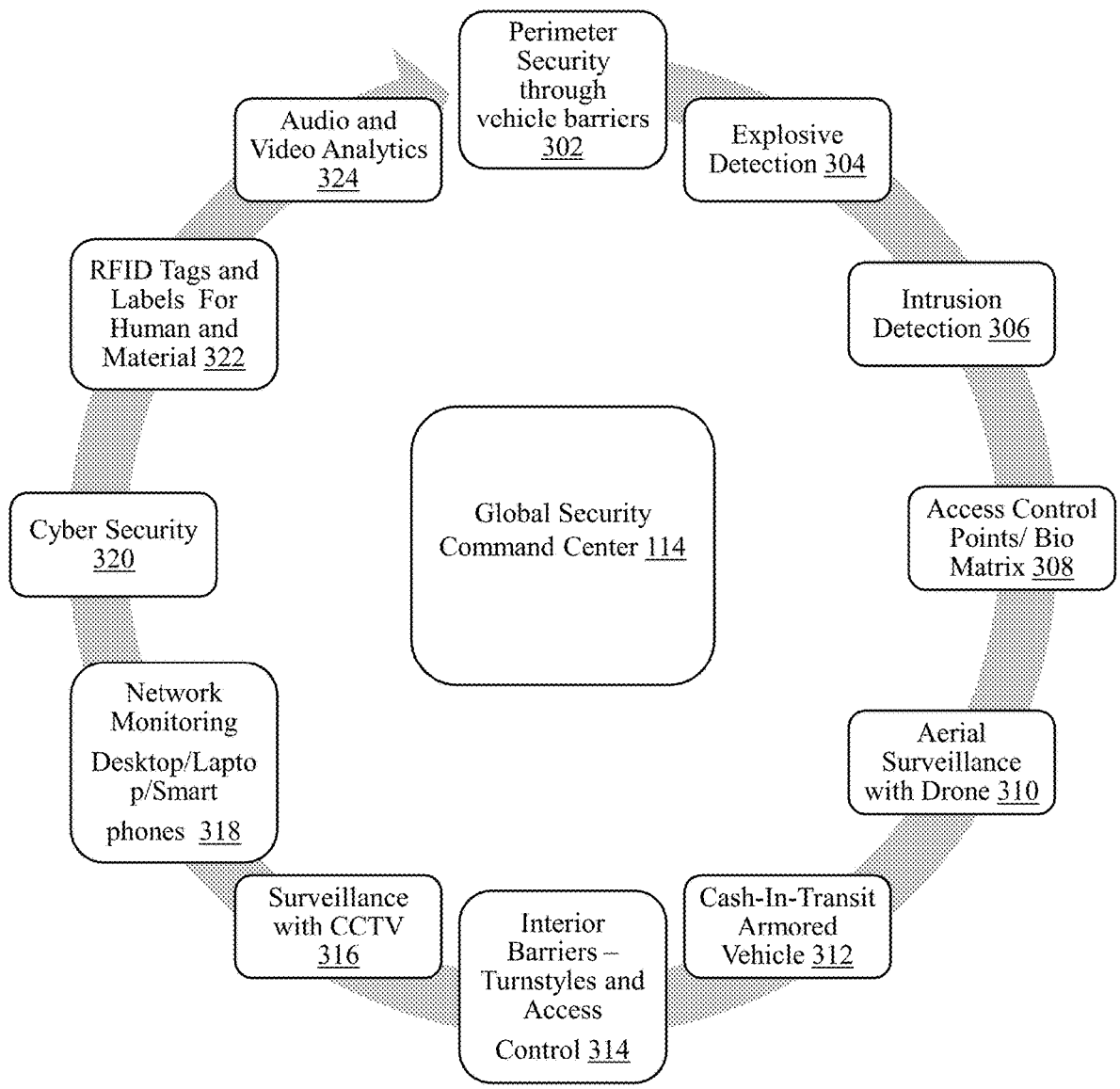
FIG. 3 is an exemplary process flow diagram depicting a process of managing threats for the organization, in accordance with an embodiment of the present disclosure.

FIG. 3 is an exemplary process flow diagram depicting a process of managing threats for the organization, in accordance with an embodiment of the present disclosure. In an embodiment of the present disclosure, all possible breaches at the organization are integrated with the GSOC 114. At step 302, perimeter security is achieved through vehicle barriers. At step 304 and at step 306, explosive detection and intrusion detection are performed respectively. At step 308, access control points or bio matrix are used for detecting events. At step 310, aerial surveillance with drone is performed. At step 312, cash in transit armoured vehicle is checked. At step 314, interior barriers turnstiles and access controls are checked. At step 316, surveillance with CCTV is performed. At step 318, networking monitoring of phones, laptop and smart phone is performed. At step 320, cyber security is ensured. At step 322, RFID tags and labels for human materials are checked. And finally, at step 324, audio and video analytics is performed. In an embodiment of the present disclosure, GSOC is capable of processing multiple security equipment, devices and system and process through all available methods and compare with user definition and generate real time alert notification as per user definition.

Figure 4:
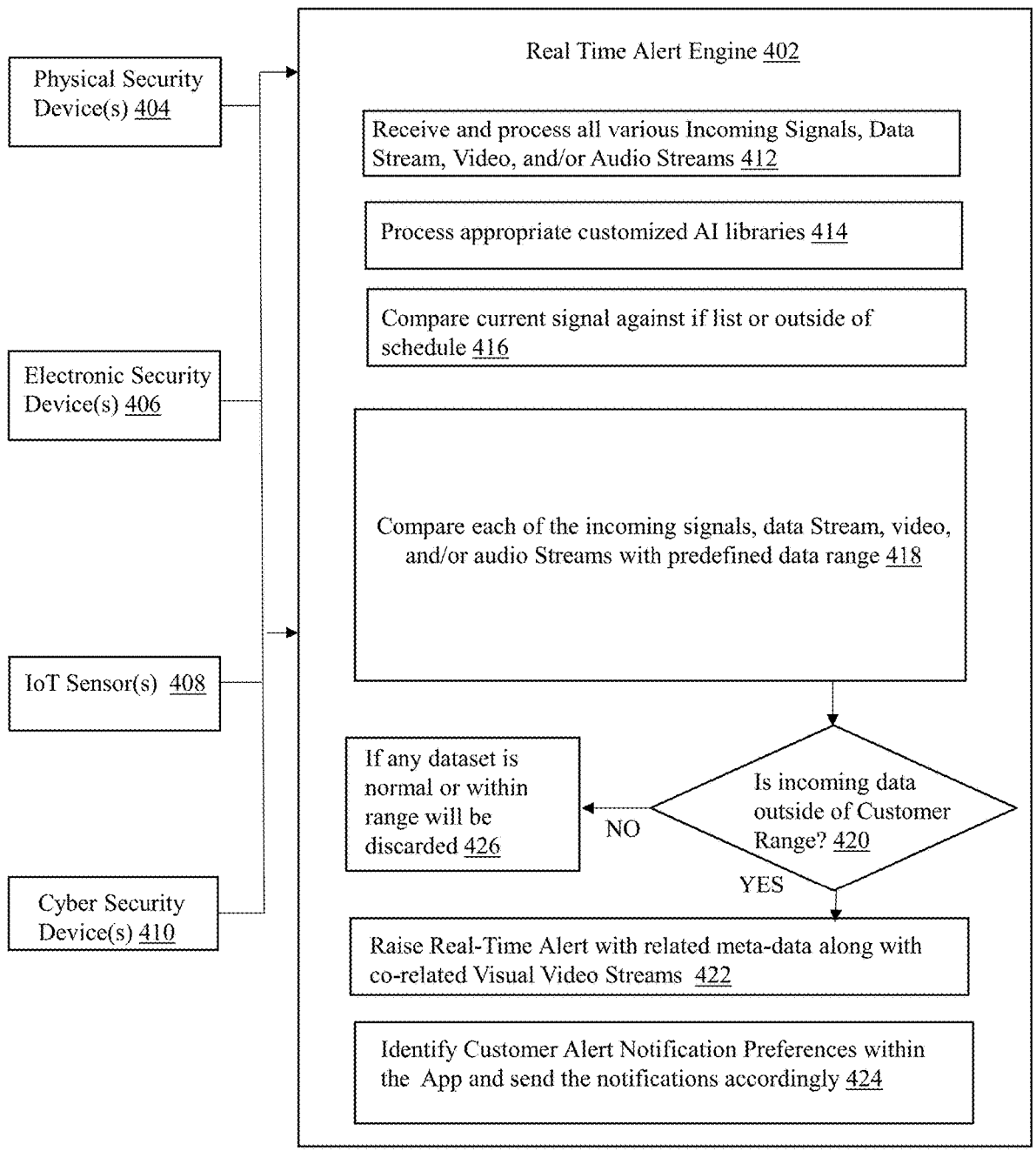
FIG. 4 is an exemplary block diagram depicting operation of the AI-based computing system to facilitate management of threats for the organization, in accordance with an embodiment of the present disclosure.

FIG. 4 is an exemplary block diagram depicting operation of the AI-based computing system 104 to facilitate management of threats for the organization, in accordance with an embodiment of the present disclosure. In an embodiment of the present disclosure, the AI-based computing system 104 includes a real time alert engine 402 configured to receive the one or more inputs from the one or more physical security devices 404, such as access control, interior exterior barriers, and the like. The real time alert engine 402 also receives the one or more inputs from the one or more electronic security devices 406, such as CCTV, analog or IP camera, biometrics and the like. Further, the real time alert engine 402 also receives the one or more inputs from the one or more IoT sensors 408, such as temperature sensor, wind sensor, hazardous gases sensor, smoking sensor, fire sensor, and the like. The real time alert engine 402 also receives the one or more inputs from the one or more cyber security devices 410, such as network event logs, SIEM and the like. Once the one or more inputs are received, the real time alert engine 402 at step 412, processes all various incoming signals, data streams, video and audio streams.

At step 414, depending on the one or more inputs type, appropriate customized AI libraries are processed, and at step 416, corresponding library compares current dataset against the predefined data range or boundaries for the one or more criteria from physical access, barriers, security camera, IoT devices, or cybersecurity devices. The one or more criteria include access restrictions, access level, schedule, geographic location, and various advanced video analytics such as motion, object detection, line crossing, face detection or recognition, and the like. Further, it is determined if datasets are outside of the predefined data range based on comparison. At step 418, for physical security signal from access control, then access control logic library is utilized to compare current signal or data stream against if list or outside of schedule, role, and the like. For security cameras, combined video, or audio stream from DVR or NVR is processed utilizing various advanced video analytics libraries and compare against customer criteria for corresponding advanced video analytics datasets. For security cameras, combined video, or audio stream from DVR or NVR is processed utilizing various advanced video analytics libraries and compare against customer criteria for corresponding advanced video analytics datasets. For the one or more IoT sensors, incoming sensor data range is compared with customer high or low range, government guidelines or regulations. For the one or more cybersecurity devices, incoming logs data is compared against any potential cyber threat, security incident, hacking attack, and the like.

The real time alert engine at step 420, checks if current one or more inputs is outside of the predefined data range. If yes, then at step 422, the real time alert engine generate the one or more real-time alerts with related meta-data along with co-related visual video streams, such as brief relevant snapshot. At step 424, the real time alert engine identifies the one or more predefined alert preferences, such as push, email, text, phone call, and the like and sends notifications accordingly. If no, then at step 426, normal dataset or within range is discarded.

Figure 5:
FIG. 5 is a graphical user interface screen of the AI-based computing system for facilitating management of threats for the organization, in accordance with an embodiment of the present disclosure.

FIG. 5 is a graphical user interface screen 500 of the AI-based computing system 104 for facilitating management of threats for the organization, in accordance with an embodiment of the present disclosure. The graphical user interface screen 500 includes an emergency management response. Timely and relevant response is a critical factor in managing every safety or security related incident. The graphical user interface screen 500 provides a series of options such as view situation in real time, communicate with internal team members, forward this information to security team, or call respective authority. The graphical user interface screen 500 also allows the user to keep a track and maintain an audit trail of each incident as it happens. This audit trail is very useful in analysis and diagnosis of response management. The emergency management response includes features such as communication. The communication feature includes acknowledgement and share alerts further when needed, report the response action, and log the events as audit trail, relay the incident information to external responders such as police, fire department and paramedics with a single click and the like. The emergency management response provides status update. The status update includes continuation of tracking of responder's action, tracking all incidents response action in real time and the like. The emergency management response includes archiving. The archiving includes data for investigation, remediation and review, logging and archiving all actions and communications, history of events of forensic analysis, mitigation, and containment strategies for similar further possibilities.

Figure 6:
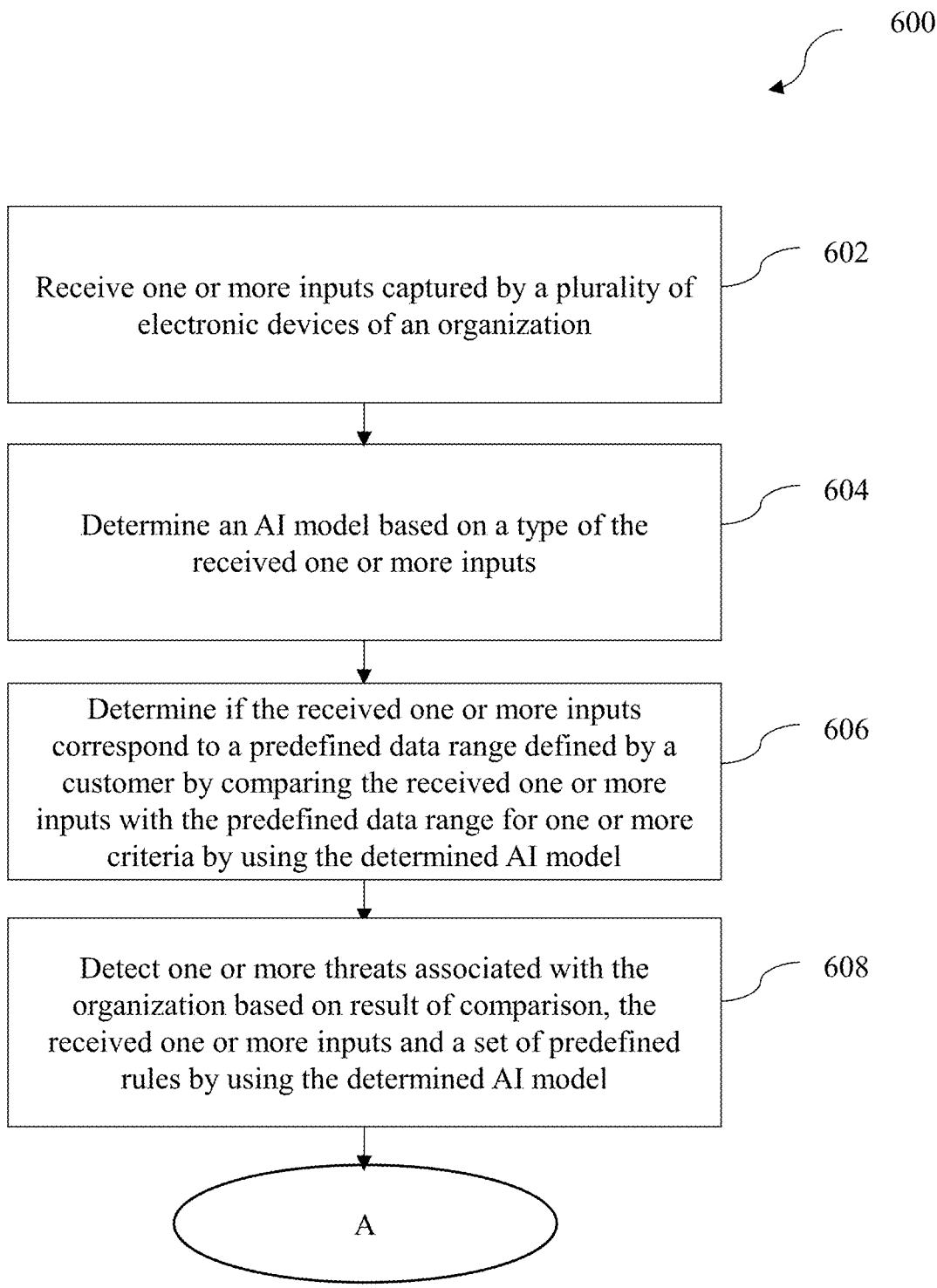
FIG. 6 is a process flow diagram illustrating an exemplary AI-based method for facilitating management of threats for the organization, in accordance with an embodiment of the present disclosure.

Further, the graphical user interface screen 500 includes mass notification and incident reporting. The graphical user interface screen 500 allows the authorized users to further broadcast any threatening alert they receive to others as necessary. The broadcast groups are configured to meet the user's requirements. Such notifications include people who may reside outside the user's organization, such as law enforcement, fire marshals, and the like. The graphical user interface screen 500 also includes security features and technical support. The security features protect user's data. The graphical user interface screen 500 also contains help features and technical support that makes the use of the present system 100 quite easy FIG. 6 is a process flow diagram illustrating an exemplary AI-based method 600 for facilitating management of threats for an organization, in accordance with an embodiment of the present disclosure. In an embodiment of the present disclosure, the AI-based method is performed by an alert device communicatively coupled to a plurality of electronic devices 102, or a central server. At step 602, one or more inputs captured by the plurality of electronic devices 102 of an organization are received. In an exemplary embodiment of the present disclosure, the plurality of electronic devices 102 include one or more physical security devices, one or more electronic security devices, one or more IoT sensors, one or more cybersecurity devices or any combination thereof. In an exemplary embodiment of the present disclosure, the one or more physical security devices include a set of access controls, biometrics access controls, a set of interior barriers, a set of exterior barriers, and the like. In an embodiment of the present disclosure, the set of access controls, biometrics access controls, the set of interior barriers, and the set of exterior barriers physical security are for physical security. The one or more electronic security devices include CCTV, license plate reader, one or more analog cameras, one or more Internet Protocol (IP) cameras, one or more biometrics, and the like. In an exemplary embodiment of the present disclosure, the one or more IoT sensors include temperature sensor, humidity sensor, pressure sensor, heat sensor, vibration sensor, accelerometer, radio frequency integration (RFID) devices, hazardous gas sensor, smoke sensor, fire sensor, and the like. The one or more cybersecurity devices include network, event logs, Security Information and Event Management (SIEM), and the like.

At step 604, an AI model is determined based on a type of the received one or more inputs. The type of the received one or more inputs is a set of incoming signals, a set of data streams, incoming sensor data range, a set of video streams, a set of incoming logs, a set of audio streams, or any combination thereof. In an embodiment of the present disclosure, the AI model is a range determination-based AI model. For example, the range determination-based AI model is a machine learning model.

At step 606, it is determined if the received one or more inputs correspond to a predefined data range defined by a customer by comparing the received one or more inputs with the predefined data range for one or more criteria associated with the plurality of electronic devices 102 by using the determined AI model. In an exemplary embodiment of the present disclosure, the one or more criteria include access restrictions, an access level, a schedule, a geographic location, advanced video analytics, and the like. Further, the advanced video analytics include motion detection, object detection, line crossing, face detection, and the like. For example, the AI-based computing system 104 may perform object detection based on configuration. These objects may be human beings, cars or some other animal based on configuration. The AI-based computing system 104 may execute face detection, and face recognition to generate appropriate alerts.

In determining if the received one or more inputs correspond to the predefined data range defined by the customer by comparing the received one or more inputs with the predefined data range for the one or more criteria associated with the plurality of electronic devices 102 by using the determined AI model, the AI-based method 600 includes comparing the set of data streams with one or more predefined stream parameters corresponding to the predefined data range by using access control logic library of the determined AI model. In an embodiment of the present disclosure, the set of data streams correspond to physical security signal from the set of access controls. In an exemplary embodiment of the present disclosure, the one or more predefined stream parameters include role, if list or outside of schedule, and the like. Further, the AI-based method 600 includes determining if the received set of data streams correspond to the predefined data range based on result of comparison.

Further, in determining if the received one or more inputs correspond to the predefined data range defined by the customer by comparing the received one or more inputs with the predefined data range for the one or more criteria associated with the plurality of electronic devices 102 by using the determined AI model, the AI-based method 600 includes performing one or more processing operations on combined set of video streams, the set of audio streams, or a combination thereof received from Digital Video Recorder (DVR), Network Video Recorder (NVR) or a combination thereof by using advanced video analytics libraries. In an exemplary embodiment of the present disclosure, the one or more processing operations include motion detection based geo-physical boundary, object detection including face detection, license plate reader, a set of harmful gas sensor, and the like. For example, the object detection is face detection. In an exemplary embodiment of the present disclosure, the set of harmful gas sensors include smoke sensor, CO sensor, CO2 sensor, ammonia sensor, benzene and the like. In an embodiment of the present disclosure, the set of video streams, and the set of audio streams are received from security cameras. Further, the AI-based method 600 includes comparing the combined set of video streams, the set of audio streams, or a combination thereof with a customer criterion for corresponding advanced video analytics datasets by using the determined AI model upon performing the one or more processing operations. In an embodiment of the present disclosure, the advanced video analytics datasets include data associated with the video stream qualities and available features. The advanced video analytics datasets is used to detect motion in the frame of video, human body movement, object movement, color definition, contract definition, object character recognition of reading the license plate characters, and the like. The AI-based method 600 includes determining if the combined set of video streams, and the set of audio streams or a combination thereof correspond to the predefined data range based on result of comparison.

Furthermore, in determining if the received one or more inputs correspond to the predefined data range defined by the customer by comparing the received one or more inputs with the predefined data range for the one or more criteria associated with the plurality of electronic devices 102 by using the determined AI model, AI-based method 600 includes comparing the incoming sensor data range received from the one or more IoT sensors with one or more predefined sensor parameters corresponding to the predefined data range by using the determined AI model. In an exemplary embodiment of the present disclosure, the one or more predefined sensor parameters include customer high, low range, government guidelines, government regulations, or any combination thereof. The AI-based method 600 includes determining if the incoming sensor data rage corresponds to the predefined data range based on result of comparison.

In an embodiment of the present disclosure, in determining if the received one or more inputs correspond to the predefined data range defined by the customer by comparing the received one or more inputs with the predefined data range for the one or more criteria associated with the plurality of electronic devices 102 by using the determined AI model, the AI-based method 600 includes comparing the set of incoming logs received from the one or more cybersecurity devices with one or more predefined security parameters corresponding to the predefined data range by using the determined AI model. For example, the set of incoming logs for cyber security perspective may include penetration, hacking, phishing, scamming, malware, virus, and the like. When incoming data stream is compared with the ideal or acceptable climate, the deviated data incoming logs are triggered for an appropriate user action. In an embodiment of the present disclosure, action may be denied access, deletion of file/email/data, turning on or off the system, or the like. In an embodiment of the present disclosure, the set of incoming logs may also include one or more cyber-attacks, such as ransomware, Distributed Denial of Services (DDOS), Structured Query Language (SQL) Injection (database related attacks), firewall attacks, open ports penetration attacks, and the like. In an embodiment of the present disclosure, the one or more predefined security parameters include one or more potential cyber threats, one or more security incidents, one or more hacking attacks, or any combination thereof. Further, the AI-based method 600 includes determining if the set of incoming logs correspond to the predefined data range based on result of comparison.

At step 608, one or more threats associated with the organization are detected based on result of comparison, the received one or more inputs and a set of predefined rules by using the determined AI model upon determining that the received one or more inputs does not correspond to the predefined data range. In an embodiment of the present disclosure, the set of predefined rules are set of rules which helps the AI-based computing system 104 to detect the threats based on the result of comparison. For example, when a perpetrator attempts to access a system in an unauthorized manner, the AI-based computing system 104 detects a cyberattack on the system by using the set of predefined rules. In an embodiment of the present disclosure, the one or more threats are one or more physical threats and one or more cyber threats. The one or more physical threats include loss of an entire computer system, damage of hardware, damage to a computer software, theft of the computer system, vandalism, natural disaster including flood, fire, war, earthquakes, and the like. The one or more cyber threats refers to any possible malicious attack that seeks to unlawfully access data, disrupt digital operations, or damage information. In an exemplary embodiment of the present disclosure, the one or more threats correspond to cyberattacks, data breach, technological failures, natural disaster, unauthorized access, intrusion, infrastructural damages, and the like.

At step 610, one or more real-time alerts corresponding to the detected one or more threats are generated based on the result of comparison, the received one or more inputs and the set of predefined rules by using the determined AI model. In an embodiment of the present disclosure, the one or more real-time alerts include related meta-data and one or more visual video streams associated with the detected one or more threats. In an embodiment of the present disclosure, the related metadata and the one or more visual video streams are obtained from the received one or more inputs. For example, the AI-based computing system 104 may generate the one or more real-time alerts for parking solutions by recognizing any state-based vehicle license plates and providing parking capacity alerts. The AI-based computing system 104 utilizes machine learning or deep learning techniques to provide accurate results over time. Further, the AI-based computing system 104 may integrate with intrusion or access control systems and generate the one or more real-time alerts for unauthorized access. The AI-based computing system 104 may identify and generate the one or more real-time alerts based on access patterns for proactive prevention of incidents. Furthermore, the AI-based computing system 104 may integrate with perimeter security by connecting the AI-based computing system 104 with different sensors such as heat, motion, pressure, vibration, accelerometer, and the like. In another example, the AI-based computing system 104 may generate alerts based on inputs received from RFID devices and other sensor devices. The AI-based computing system 104 processes these inputs and signal to decide on appropriate type of alerts. The user of the AI-based computing system 104 mark devices as sensitive and configure them for notification. The users can track alerts and respond through their respective mobile application via, text, or email communication or the like.

At step 512, one or more recommendations are generated for responding to the detected one or more threats based on the result of comparison, the received one or more inputs, the detected one or more threats and a predefined recommendation information by using the determined AI model upon generating the one or more real-time alerts. In an embodiment of the present disclosure, the predefined recommendation information is a look-up table of possible recommendations which may be generated for the detected one or more threats. For example, the one or more recommendations may include disconnect your internet, disable remote access, maintain your firewall settings, install any pending security updates or patches, change passwords, and the like.

At step 514, the detected one or more threats, the generated one or more real-time alerts and the generated one or more recommendations are outputted on user interface screen of one or more user devices 108 associated with the one or more security professionals via the one or more predefined alert preferences. In an embodiment of the present disclosure, the one or more predefined alert preferences include push notification, email, text, phone call, and the like.

Further, the AI-based method 600 includes determining if the detected one or more threats are one or more real threats or one or more false positives. In an embodiment of the present disclosure, conversion of threat from false positive to real threat is a major technological challenge. The AI model, ML model or a combination thereof, and advance video analytics are developed for such conversion. In an embodiment of the present disclosure, motion-based alerts are verified with face detection. The sensor data is verified and re-verified with the pattern of data and integrated with other data stream if available. In an embodiment of the present disclosure, AI model may facilitate in reduction of "false alerts" by verifying multiple additional criteria that may reduce human element thus reducing overall cost per alert. Further, the AI-based method 600 includes classifying the detected one or more threats in one or more categories upon determining that the detected one or more threats are the one or more real threats. Based on the user definition, severity may be classified in different categories which can be associated with video stream data, sensor data or access control data. These alerts may have multiple user definition and multiple real time alerts may be generated as per user definition. In an embodiment of the present disclosure, the one or more categories may include camera alerts with face detection, motion detection, sensor alerts, cybersecurity alerts and the like. In an exemplary embodiment of the present disclosure, the sensor alerts correspond to smoke, smoking, CO, CO2, and various other harmful gases. In an exemplary embodiment of the present disclosure, the cybersecurity alerts may be ransomware, DDOS, SQL, and the like. In an embodiment of the present disclosure, the one or more categories include high, medium, low, and safe. The AI-based method 600 includes outputting the classified one or more threats on user interface screen of the one or more user devices 108 via the one or more predefined alert preferences.

The AI-based method 600 may be implemented in any suitable hardware, software, firmware, or combination thereof.

Thus, various embodiments of the present AI-based computing system 104 provide a solution to facilitate management of threats for the organization. The AI-based computing system 104 acts as a virtual sentry. The AI-based computing system 104 brings the capability to unify the efforts of wide variety of existing security systems and leverage them to generate a single stream of real time alerts and short video clips. The present system extends the users eyes and ears and enables them to see the events they want to see when such events occur conveniently. The intended groups or people who are responsible for safety and security receive these alerts and video clips through the present system on their mobile application devices. Equipped with this information, people can take immediate incident response action and contain the damage. This pre-empts conventional model of a post-mortem response and forensic analysis of a total loss situation. Conventional system does not allow real time alert notification and opportunity to take proactive action and contain the damage. Also, the users come to know when total loss already occurred and it's too late to react. Furthermore, the AI-based computing system 104 senses and processes signals from various security systems within an enterprise, generate alerts and delivers them in real time to mobile application or other devices. The AI-based computing system 104 may also receive real time alerts from various devices including any video surveillance devices and unify them in single interface for the present system user. In an embodiment of the present disclosure, the AI-based computing system 104 may perform video and other related analytics, using video and other related processing techniques and using machine learning based algorithms to provide the right security alerts.

In an embodiment of the present disclosure, organizations need to combat security threats in a cohesive and unified manner. A single mode of contact to facilitate communications between staffs is required, especially given the fact that stages for addressing physical and cyber security threats follow similar processes such as detection and alert, containment, remediation, conclusion, and assessment. To create a unified approach, the AI-based computing system 104 collects the one or more inputs from the plurality of electronic devices 102 including physical security, perimeter security such as vehicle barriers, electronic security access controls, CCTV, badge card readers, operational security, such as Heating Ventilation and Air Conditioning (HVAC), fire, power grid, and the like, and other IoT gadgets and convert these inputs into a compatible format of cyber security. Most of the security equipment and smart equipment are available on network based and can be defined via IP. Each system and equipment available on network, may be subject for cyber threat. All network-based equipments are compatible for cyber security via GSOC. In an embodiment of the present disclosure, all newer devices has capability to connect with IP Address. Thus, the AI-based computing system 104 can connect and generate an appropriate alerts based on predefined parameters. The GSOC 114 monitors these inputs received from this device. This mechanism provides a central point of coordination to monitor and respond to threats to business operations regardless of where the threats originate. Since AI-based computing system 104 provides a single point of coordination, such as a GSOC 114, the positions of the organizations become much stronger and stable in order to respond to a crisis. Further, in an era of budget austerity, consolidating physical and cybersecurity systems offer significant cost savings. Furthermore, the AI-based computing system 104 provides a unified response to any of the processes which allows the organizations to respond earlier, recover faster and resume business operations faster.

Further, the AI-based computing system 104 supports technology convergence by working with legacy video surveillance systems, such as twenty years old analog cameras, and makes them smarter without any hardware upgrade. At the same time, the AI-based computing system 104 works with any type of security systems or in combination of these devices irrespective of its brand, make or model. The AI-based computing system 104 may also integrate with any brand of analog or digital cameras seamlessly and converts them virtually in smart cameras. In an embodiment of the present disclosure, legacy video surveillance system does not have any proactive features and replacement of hardware is very cost prohibitive. The AI-based computing system 104 can convert legacy system in to smart and intelligent by implementing AI system and real time alert notification system. For example, 20 years old analog CCTV system doesn't have any of the newer IP based camera system features. The AI-based computing system 104 work with old CCTV system and ingest newer features dynamically and make these systems technically smarter. Further, various features of the AI-based computing system 104 include just-in-time detection, real time alerts, security devices such as cameras, access control, motion detectors and the like, mass notifications, emergency response management, reporting and archiving and security features and technical support. The first and most important step is timely detection of various events. Based on user-defined and customizable inputs, the AI-based computing system 104 detects anything that is not normal, right as and when it is happening. Furthermore, the AI-based computing system 104 provides real time-alerts. The next critical step after timely detection is communicating relevant information to right people. The AI-based computing system 104 sends information immediately to people designated to receive information, such as the one or more security professionals. In an embodiment of the present disclosure, architecture of the AI-based computing system 104 is flexible to accommodate enhancements in the future to incorporate other type of devices with minimum changes. Conversion of legacy system requires many security system to be integrated with the AI based computing system 104. Having flexible architecture allows user to bring many different systems to be integrated collaboratively or individually with different user definition. The flexible architecture of the AI-based computing system 104 works with various type of mobile application, desktop, laptops as well as any kind of CCTV—old or new. The AI-based computing system 104 senses and processes signals from various security systems within an enterprise intelligently, generate alerts and delivers them in real time to mobile or other devices as necessary. Further, the computing system 104 may detect motion based on received signals or streaming from the camera or other sensing devices. User, as administrator, may schedule and configure these alerts based on the installed location and sensitivity of area.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. An Artificial Intelligence (AI)-based computing system for facilitating management of threats for an organization, the AI-based computing system comprising:
    one or more hardware processors; and
    a memory coupled to the one or more hardware processors, wherein the memory comprises a plurality of modules in the form of programmable instructions executable by the one or more hardware processors, and wherein the plurality of modules comprises:
    a data receiver module configured to receive one or more inputs captured by a plurality of electronic devices of the organization, wherein the plurality of electronic devices comprise: one or more physical security devices, one or more electronic security devices, one or more Internet of Things (IoT) sensors and one or more cybersecurity devices, wherein the AI-based computing system is further configured to support technology convergence to integrate with conventional one or more physical security devices, and wherein the one or more physical security devices are at least one of: at least one access control point, at least one interior barrier, and at least one exterior barrier, wherein the one or more physical security devices are located at a geographic location and provide physical security for the geographic location;
    a model determination module configured to determine an AI model based on a type of the received one or more inputs, wherein the type of the received one or more inputs is at least one of: a set of incoming signals, a set of data streams, incoming sensor data range, a set of video streams, a set of incoming logs, and a set of audio streams, and wherein the AI model is a range determination-based AI model;
    a range determination module configured to determine if the received one or more inputs correspond to a predefined data range defined by a user by comparing the received one or more inputs with the predefined data range for one or more criteria associated with the plurality of electronic devices by using the determined AI model;
    a data detection module configured to detect one or more threats associated with the organization based on a result of comparison of the received one or more inputs and a set of predefined rules, wherein the comparison of the received one or more inputs and the set of predefined rules, includes the comparison of:
        the set of data streams with one or more predefined stream parameters,
        at least one of: the set of video streams and the set of audio streams with a user criterion,
        the incoming sensor data range with one or more predefined sensor parameters, and
        the set of incoming logs with one or more predefined security parameters,
    by using the determined AI model upon determining that the received one or more inputs does not correspond to the predefined data range, wherein the one or more threats are one or more physical threats and one or more cyber threats;
    a severity determination module configured to:
        determine the detected one or more threats are one of: one or more real threats and one or more false positives, using at least one of: the determined AI model, a Machine Learning model (ML-model), and processing the set of video streams, wherein one or more visual video streams are used to generate motion-based alerts, wherein the motion-based alerts are verified with face detection, and the incoming sensor data range is verified and re-verified with pre-defined patterns of data; and
upon determining the detected one or more threats are the one or more real threats: classify the detected one or more threats in one or more severity categories, wherein the one or more severity categories are selected from a group consisting of: high, medium, low, and safe; and classify the detected one or more threats in one or more alert categories, wherein the one or more alert categories are selected from a group consisting of: camera alerts with face detection, motion detection, sensor alerts, and cybersecurity alerts;
an alert generation module configured to generate one or more real-time alerts corresponding to the detected and classified one or more threats based on the result of comparison, the received one or more inputs and the set of predefined rules by using the determined AI model, wherein the one or more real-time alerts comprise related meta-data and the one or more visual video streams associated with the detected one or more threats, and wherein the related metadata and the one or more visual video streams are obtained from the received one or more inputs;
a recommendation generation module configured to generate one or more recommendations for responding to the detected one or more threats based on the result of comparison, the received one or more inputs, the detected and classified one or more threats and a predefined recommendation information by using the determined AI model upon generating the one or more real-time alerts; and
a data output module configured to output the detected one or more threats, the generated one or more real-time alerts and the generated one or more recommendations on a user interface screen of one or more user devices associated with one or more security professionals via one or more predefined alert preferences, wherein the one or more predefined alert preferences are at least one of: push notification, email, text and phone call.

2. The AI-based computing system of claim 1, wherein the one or more electronic security devices are at least one of: closed-circuit television (CCTV), license plate reader, one or more analog cameras, one or more Internet Protocol (IP) cameras, and one or more biometrics, wherein the one or more IoT sensors are at least one of: temperature sensor, humidity sensor, pressure sensor, heat sensor, vibration sensor, accelerometer, radio frequency integration (RFID) devices, hazardous gas sensor, smoke sensor and fire sensor, and wherein the one or more cybersecurity devices are at least one of: network devices, event logs, and Security Information and Event Management (SIEM).

3. The AI-based computing system of claim 1, wherein the one or more criteria are at least one of: access restrictions, an access level, a schedule, a geographic location, and advanced video analytics, and wherein the advanced video analytics are at least one of: motion detection, object detection, line crossing and face detection.

4. The AI-based computing system of claim 1, wherein the one or more threats correspond to cyberattacks, data breach, technological failures, natural disaster, unauthorized access, intrusion, and infrastructural damages.

5. The AI-based computing system of claim 1, wherein in determining if the received one or more inputs correspond to the predefined data range defined by the user by comparing the received one or more inputs with the predefined data range for the one or more criteria associated with the plurality of electronic devices by using the determined AI model, the range determination module is configured to:
compare the set of data streams with the one or more predefined stream parameters corresponding to the predefined data range by using an access control logic library of the determined AI model, wherein the set of data streams correspond to a physical security signal from the at least one access control point, and wherein the one or more predefined stream parameters comprise:
a role associated with a person identified through face recognition,
a list including a set of facial features corresponding to the person associated with the role; and
an indication that the one or more predefined stream parameters occurs outside a predefined schedule of the person associated with the role; and
determine if the received set of data streams correspond to the predefined data range based on the result of comparing the set of data streams with the one or more predefined stream parameters.

6. The AI-based computing system of claim 1, wherein in determining if the received one or more inputs correspond to the predefined data range defined by the user by comparing the received one or more inputs with the predefined data range for the one or more criteria associated with the plurality of electronic devices by using the determined AI model, the range determination module is configured to:
perform one or more processing operations on combined at least one of: the set of video streams, and the set of audio streams received from at least one of: Digital Video Recorder (DVR) and Network Video Recorder (NVR) by using advanced video analytics libraries, wherein the set of video streams, and the set of audio streams are received from security cameras, and wherein the one or more processing operations are at least one of: motion detection based geo-physical boundary, object detection including face detection, license plate reader, and a set of harmful gas sensors;
compare the combined at least one of: the set of video streams, and the set of audio streams with the user criterion for corresponding advanced video analytics datasets by using the determined AI model upon performing the one or more processing operations, wherein the advanced video analytics datasets are used to detect motion in a frame of a video, human body movement, object movement, color definition, contract definition, and object character recognition of reading license plate characters; and
determine if the combined at least one of: the set of video streams, and the set of audio streams correspond to the predefined data range based on the result of comparing the at least one of: the set of video streams and the set of audio streams with the user criterion.

7. The AI-based computing system of claim 1, wherein in determining if the received one or more inputs correspond to the predefined data range defined by the user by comparing the received one or more inputs with the predefined data range for the one or more criteria associated with the plurality of electronic devices by using the determined AI model, the range determination module is configured to:
compare the incoming sensor data range received from the one or more IoT sensors with the one or more predefined sensor parameters corresponding to the predefined data range by using the determined AI model, wherein the one or more predefined sensor parameters are at least one of: user high, low range, government guidelines and government regulations; and
determine if the incoming sensor data rage corresponds to the predefined data range based on the result of comparing the incoming sensor data range with the one or more predefined sensor parameters.

8. The AI-based computing system of claim 1, wherein in determining if the received one or more inputs correspond to the predefined data range defined by the user by comparing the received one or more inputs with the predefined data range for the one or more criteria associated with the plurality of electronic devices by using the determined AI model, the range determination module is configured to:
compare the set of incoming logs received from the one or more cybersecurity devices with the one or more predefined security parameters corresponding to the predefined data range by using the determined AI model, wherein the set of incoming logs are one or more cyber-attacks, wherein the one or more cyber-attacks are at least one of: ransomware, Distributed Denial of Services (DDOS), Structured Query Language (SQL) Injection, firewall attacks, and open ports penetration attacks, and wherein the one or more predefined security parameters are at least one of: one or more potential cyber threats, one or more security incidents, and one or more hacking attacks; and
determine if the set of incoming logs correspond to the predefined data range based on the result of comparing the set of incoming logs with the one or more predefined security parameters.

9. The AI-based computing system of claim 1, a wherein the severity determination module is further configured to:
output the detected and classified one or more threats on the user interface screen of the one or more user devices via the one or more predefined alert preferences.

10. The AI-based computing system of claim 1, wherein the AI-based computing system corresponds to one of: an alert device communicatively coupled to the plurality of electronic devices, and a central server, wherein the alert device comprises one or more smart sensors to capture environmental data, and wherein the environmental data is at least one of: air quality data, smoke temperature data, and humidity data.

11. An Artificial Intelligence (AI)-based method for facilitating management of threats for an organization, the method comprising:
receiving, by one or more hardware processors, one or more inputs captured by a plurality of electronic devices of the organization from, wherein the plurality of electronic devices comprise one or more physical security devices, one or more electronic security devices, one or more Internet of Things (IoT) sensors and one or more cybersecurity devices, wherein the AI-based computing system is further configured to support technology convergence to integrate with conventional one or more physical security devices, and wherein the one or more physical security devices are at least one of: at least one access control point, at least one interior barrier, and at least one exterior barrier, wherein the one or more physical security devices are located at a geographic location and provide physical security for the geographic location;
determining, by the one or more hardware processors, an AI model based on a type of the received one or more inputs, wherein the type of the received one or more inputs is at least one of: a set of incoming signals, a set of data streams, incoming sensor data range, a set of video streams, a set of incoming logs, and a set of audio streams, and wherein the AI model is a range determination-based AI model;
determining, by the one or more hardware processors, if the received one or more inputs correspond to a predefined data range defined by a user by comparing the received one or more inputs with the predefined data range for one or more criteria associated with the plurality of electronic devices by using the determined AI model;
detecting, by the one or more hardware processors, one or more threats associated with the organization based on a result of comparison of the received one or more inputs and a set of predefined rules, wherein the comparison of the received one or more inputs and the set of predefined rules, includes the comparison of:
the set of data streams with one or more predefined stream parameters,
at least one of: the set of video streams and the set of audio streams with a user criterion,
the incoming sensor data range with one or more predefined sensor parameters, and
the set of incoming logs with one or more predefined security parameters,
by using the determined AI model upon determining that the received one or more inputs does not correspond to the predefined data range, wherein the one or more threats are one or more physical threats or one or more cyber threats;
determining, by the one or more hardware processors, the detected one or more threats are one of: one or more real threats and one or more false positives, using at least one of: the determined AI model, a Machine Learning model (ML-model), and processing the set of video streams, wherein one or more visual video streams are used to generate motion-based alerts, wherein the motion-based alerts are verified with face detection, and the incoming sensor data range is verified and re-verified with pre-defined patterns of data;
upon determining the detected one or more threats are the one or more real threats: classifying, by the one or more hardware processors, the detected one or more threats in one or more severity categories, wherein the one or more severity categories are selected from a group consisting of: high, medium, low, and safe; and classifying, by the one or more hardware processors, the detected one or more threats in one or more alert categories, wherein the one or more alert categories are selected from a group consisting of: camera alerts with face detection, motion detection, sensor alerts, and cybersecurity alerts;
generating, by one or more hardware processors, one or more real-time alerts corresponding to the detected and classified one or more threats based on the result of comparison, the received one or more inputs and the set of predefined rules by using the determined AI model, wherein the one or more real-time alerts comprise related meta-data and the one or more visual video streams associated with the detected one or more threats, and wherein the related metadata and the one or more visual video streams are obtained from the received one or more inputs;
generating, by one or more hardware processors, one or more recommendations for responding to the detected one or more threats based on the result of comparison, the received one or more inputs, the detected and classified one or more threats and a predefined recommendation information by using the determined AI model upon generating the one or more real-time alerts; and outputting, by the one or more hardware processors, the detected one or more threats, the generated one or more real-time alerts and the generated one or more recommendations on a user interface screen of one or more user devices associated with one or more security professionals via one or more predefined alert preferences, wherein the one or more predefined alert preferences are at least one of: push notification, email, text and phone call.

12. The AI-based method of claim 11, wherein the one or more electronic security devices are at least one of: closed-circuit television (CCTV), license plate reader, one or more analog cameras, one or more Internet Protocol (IP) cameras, and one or more biometrics, wherein the one or more IoT sensors comprise are at least one of: temperature sensor, humidity sensor, pressure sensor, heat sensor, vibration sensor, accelerometer, radio frequency integration (RFID) devices, hazardous gas sensor, smoke sensor and fire sensor, and wherein the one or more cybersecurity devices are at least one of: network devices, event logs, and Security Information and Event Management (SIEM).

13. The AI-based method of claim 11, wherein the one or more criteria are at least one of: access restrictions, an access level, a schedule, a geographic location, and advanced video analytics, and wherein the advanced video analytics are at least one of: motion detection, object detection, line crossing and face detection.

14. The AI-based method of claim 11, wherein the one or more threats correspond to cyberattacks, data breach, technological failures, natural disaster, unauthorized access, intrusion, and infrastructural damages.

15. The AI-based method of claim 11, wherein in determining if the received one or more inputs correspond to the predefined data range defined by the user by comparing the received one or more inputs with the predefined data range for the one or more criteria associated with the plurality of electronic devices by using the determined AI model, the AI-based method includes:

comparing the set of data streams with the one or more predefined stream parameters corresponding to the predefined data range by using an access control logic library of the determined AI model, wherein the set of data streams correspond to a physical security signal from the at least one access control point, and wherein the one or more predefined stream parameters comprise:
- a role associated with a person identified through face recognition,
- a list including a set of facial features corresponding to the person associated with the role; and
- an indication that the one or more predefined stream parameters occurs outside a predefined schedule of the person associated with the role; and determining if the received set of data streams correspond to the predefined data range based on the result of comparing the set of data streams with the one or more predefined stream parameters.

16. The AI-based method of claim 11, wherein in determining if the received one or more inputs correspond to the predefined data range defined by the user by comparing the received one or more inputs with the predefined data range for the one or more criteria associated with the plurality of electronic devices by using the determined AI model, the AI-based method includes:

performing one or more processing operations on combined at least one of: the set of video streams, and the set of audio streams received from at least one of: Digital Video Recorder (DVR) and Network Video Recorder (NVR) by using advanced video analytics libraries, wherein the set of video streams, and the set of audio streams are received from security cameras, and wherein the one or more processing operations are at least one of: motion detection based geo-physical boundary, object detection including face detection, license plate reader, and a set of harmful gas sensors;

comparing the combined at least one of: the set of video streams, and the set of audio streams with the user criterion for corresponding advanced video analytics datasets by using the determined AI model upon performing the one or more processing operations, wherein the advanced video analytics datasets are used to detect motion in a frame of a video, human body movement, object movement, color definition, contract definition, and object character recognition of reading license plate characters; and determining if the combined at least one of: the set of video streams, and the set of audio streams correspond to the predefined data range based on the result of comparing the at least one of: the set of video streams and the set of audio streams with the user criterion.

17. The AI-based method of claim 11, wherein in determining if the received one or more inputs correspond to the predefined data range defined by the user by comparing the received one or more inputs with the predefined data range for the one or more criteria associated with the plurality of electronic devices by using the determined AI model, the AI-based method includes:

comparing the incoming sensor data range received from the one or more IoT sensors with the one or more predefined sensor parameters corresponding to the predefined data range by using the determined AI model, wherein the one or more predefined sensor parameters are at least one of: user high, low range, government guidelines and government regulations; and determining if the incoming sensor data rage corresponds to the predefined data range based on the result of comparing the incoming sensor data range with the one or more predefined sensor parameters.

18. The AI-based method of claim 11, wherein in determining if the received one or more inputs correspond to the predefined data range defined by the user by comparing the received one or more inputs with the predefined data range for the one or more criteria associated with the plurality of electronic devices by using the determined AI model, the AI-based method includes:

comparing the set of incoming logs received from the one or more cybersecurity devices with the one or more predefined security parameters corresponding to the predefined data range by using the determined AI model, wherein the set of incoming logs are one or more cyber-attacks, wherein the one or more cyber-attacks are at least one of: ransomware, Distributed Denial of Services (DDOS), Structured Query Language (SQL) Injection, firewall attacks, and open ports penetration attacks, and wherein the one or more predefined security parameters are at least one of: one or more potential cyber threats, one or more security incidents, and one or more hacking attacks; and determining if the set of incoming logs correspond to the predefined data range based on the result of comparing the set of incoming logs with the one or more predefined security parameters.

19. The AI-based method of claim 11, further comprising: outputting the detected and classified one or more threats on the user interface screen of the one or more user devices via the one or more predefined alert preferences.

20. The AI-based method of claim 11, wherein the AI-based method is performed by one of: an alert device communicatively coupled to the plurality of electronic devices, and a central server, wherein the alert device one or more smart sensors to capture environmental data, and wherein the environmental data is at least one of: air quality data, smoke temperature data, and humidity data.

* * * * *